United States Patent
Gupta et al.

(10) Patent No.: US 10,181,088 B2
(45) Date of Patent: Jan. 15, 2019

(54) METHOD FOR VIDEO OBJECT DETECTION

(75) Inventors: Amit Kumar Gupta, Liverty Grove (AU); Ashley Partis, Camperdown (AU); Xin Yu Liu, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 890 days.

(21) Appl. No.: 13/277,964

(22) Filed: Oct. 20, 2011

(65) Prior Publication Data

US 2012/0106856 A1 May 3, 2012

(30) Foreign Application Priority Data

Oct. 29, 2010 (AU) ................................ 2010238543

(51) Int. Cl.
  *G06T 7/194* (2017.01)
  *G06K 9/38* (2006.01)
  *G06K 9/00* (2006.01)

(52) U.S. Cl.
  CPC ........... *G06K 9/38* (2013.01); *G06K 9/00771* (2013.01); *G06T 7/194* (2017.01)

(58) Field of Classification Search
  CPC .................. G06N 3/08; G06T 7/0081; G06T 2207/10016; G06T 2207/20144; G06T 2207/20081; G06T 7/194; G06T 7/11; G06T 7/187; G06K 9/38; G06K 9/00771; G06K 9/4638; G06K 9/342; G06K 9/00624
  USPC .......................................................... 706/12
  See application file for complete search history.

(56) References Cited

U.S. PATENT DOCUMENTS 5,546,476 A * 8/1996 Mitaka et al. ................. 382/201
7,536,032 B2 5/2009 Bell
7,574,043 B2 * 8/2009 Porikli .......................... 382/173
(Continued)

FOREIGN PATENT DOCUMENTS

CN        1991865 A    4/2007
WO  WO 2009105812 A1 *  9/2009  ......... G06K 9/00771

OTHER PUBLICATIONS

Herrero-Jaraba et al.; "Detected motion classification with a double-background and a neighborhood-based difference"; Pattern Recogn. Lett. 2003, 24, pp. 2079-2092.
(Continued)

*Primary Examiner* — Andrew Moyer
*Assistant Examiner* — Dennis Rosario
(74) *Attorney, Agent, or Firm* — Canon USA, Inc. I.P. Division

(57) ABSTRACT

A system and method for performing foreground/background separation on an input image. The method identifies a corresponding model visual element in a scene model associated with the input image, the model visual element being associated with a set of element models, each element model including a plurality of visual data sets. Select an element model from the set of element models, dependent upon a visual distance between the input visual element and a visual data set of the selected element model satisfying a predetermined criterion. The method classifies the input visual element as one of foreground and background, dependent upon the selected element model, and then updates each visual data set in the selected element model, dependent upon the input visual element and at least first and second different methods of updating a visual data set.

11 Claims, 10 Drawing Sheets

(56) References Cited

U.S. PATENT DOCUMENTS

| | | | |
|---|---|---|---|
| 2008/0152236 A1* | 6/2008 | Vendrig | G06K 9/38 |
| | | | 382/224 |
| 2009/0060278 A1 | 3/2009 | Hassan-Shafique et al. | |
| 2010/0128930 A1 | 5/2010 | Liu et al. | |
| 2010/0195870 A1* | 8/2010 | Ai et al. | 382/103 |
| 2010/0214413 A1* | 8/2010 | Lin et al. | 348/150 |

OTHER PUBLICATIONS

Lu et al.; "Motion detection based on accumulative optical flow and double background filtering". In International Conference of Signal and Image Engineering, World Congress on Engineering: 2007; p. 2-4. (Nan Lu et al.,2007) (ConferenceProceedings) (Motion Detection Based on Accumulative Optical Flow and Double Background Filter.pdf).

Boult et al.: "Into the woods: visual surveillance of noncooperative and camouflaged targets in complex outdoor settings." Proceedings of the IEEE Oct. 2001, 89, pp. 1382-1402. (Boult, T.E. et al.,2001) (Journal Article) (visual surveillance of non-cooperative and camouflaged targets in complex outdoo.pdf).

Stauffer et al.; "Learning Patterns of Activity Using Real-Time Tracking"; IEEE Transactions on Pattern Analysis and Machine Intelligence Aug. 22, 2000, pp. 747-757. (Chris Stauffer et al.,2000) (Journal Article) (stauffer_learning2000.pdf).

\* cited by examiner

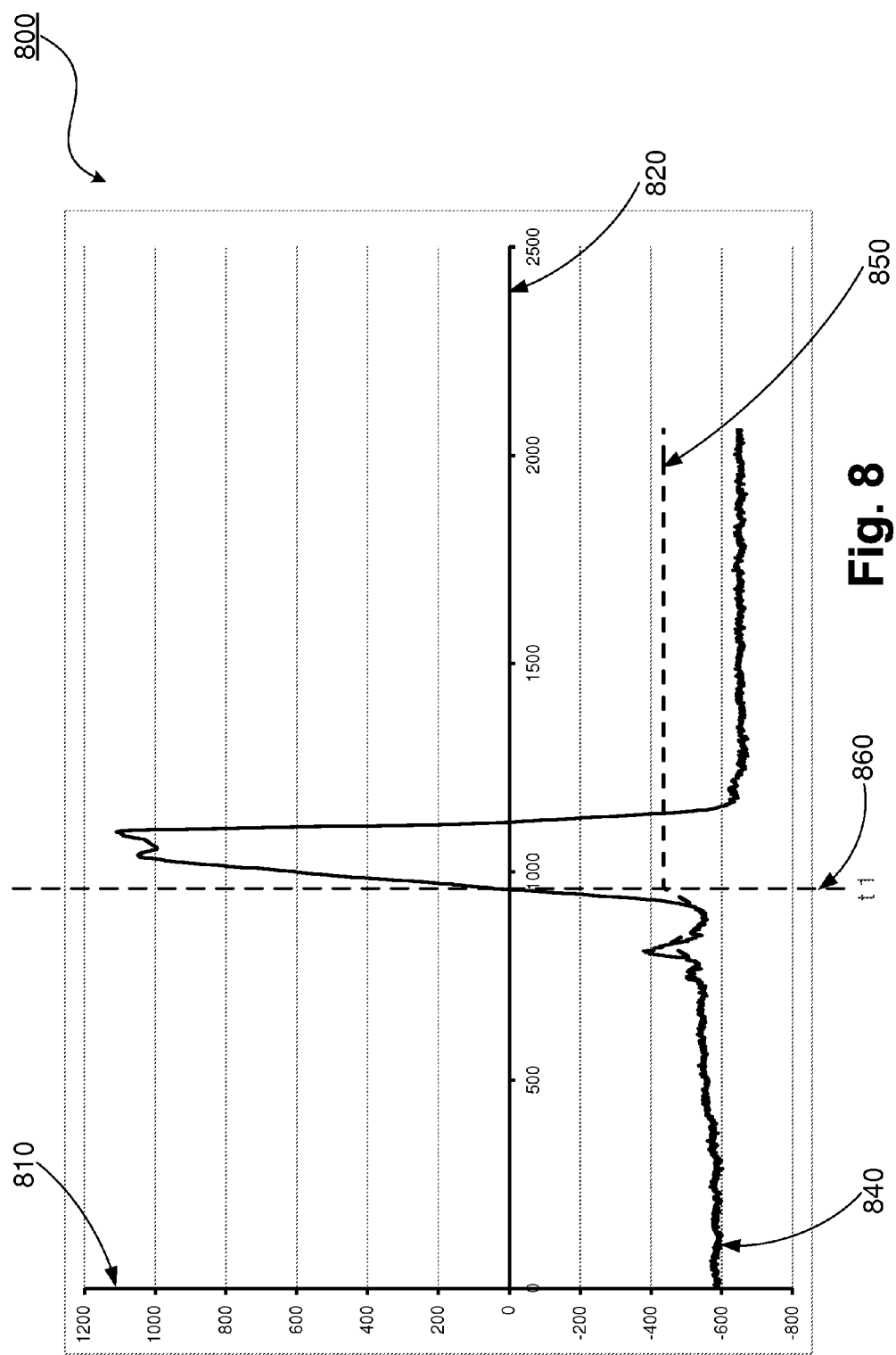

METHOD FOR VIDEO OBJECT DETECTION

TECHNICAL FIELD

The present disclosure relates generally to video processing and, in particular, to the separation of foreground objects from a background in video.

BACKGROUND

Video cameras, such as Pan-Tilt-Zoom (PTZ) cameras, are omnipresent nowadays, and are often used for surveillance purposes. The cameras capture more data (video content) than human viewers can process. Automatic analysis of video content is therefore needed.

The terms foreground objects and foreground refer to transient objects that appear in a scene captured on video. Such transient objects may include, for example, moving humans. The remaining part of the scene is considered to be a background region, even if the remaining part includes movement, such as water ripples or grass moving in the wind.

An important step in the processing of video content is the separation of video data into foreground objects and a background scene, or background. This process is called foreground/background separation. Such separation allows for further analysis, such as detection of specific foreground objects, or tracking of moving objects. Such further analysis has many applications, including, for example, automated video surveillance and statistics gathering, such as people counting.

One method of foreground/background separation is statistical scene modelling. In one example, a number of Gaussian distributions are maintained for each pixel to model the recent history of the pixel. When a new input frame is received, each pixel from the input frame is evaluated against the Gaussian distributions maintained by the model at the corresponding pixel location. If the input pixel matches one of the Gaussian distributions, then the parameters of the associated Gaussian distribution are updated with an adaptive learning rate. Otherwise, a new Gaussian model for the pixel is created.

Another method of foreground/background separation maintains two pixel-based background models, B1 and B2. B1 contains the minimum value for each pixel location during the initialisation period and B2 contains the maximum value. When a new frame is received, the difference between the input frame and each of the background models is computed on a per-pixel basis. For each pixel, the corresponding model with the smallest difference for that pixel is updated using an approximated median update method with a fixed learning rate.

Another technique uses a double background model that is able to handle both rapid and gradual changes of the scene. In order to do that, a normal background model is derived from a list of cached frames that were sampled at a constant rate. The double background model system also tries to detect a large change condition in the scene. Only once a large change condition is detected is a new background model created, based on another list of cached frames that were sampled at a faster rate than the normal background model.

The development of a robust scene model is crucial for producing accurate foreground/background separation. One of the main challenges in building a robust scene model is adapting to changes in the scene. Some existing techniques handle gradual and slow changes very well. However, when changes in a scene become large and fast, the models of those existing techniques cannot catch up with the changes and consequently result in a large amount of false foreground detection. Another type of change that includes a prolonged large and fast change from a steady state followed by a quick and sudden reversion to the steady state cannot be handled by existing techniques. Existing methods that handle the first type of change, which includes a large and fast change, do not handle a sudden reversion. Conversely, existing methods that handle the second type of change, which includes a sudden reversion, do not handle a large and fast change.

Thus, a need exists for an improved method of video object detection.

SUMMARY

The present disclosure relates to a method and system for updating a scene model for use in performing foreground/background separation in image processing. The foreground/background separation can then be utilised to identify foreground objects in a video sequence. The present disclosure provides a set of element models associated with each model visual element in a scene model. Each element model is associated with a plurality of visual data sets. The method utilises the visual data sets to select an element model and then classifies an input visual element dependent upon the selected element model. The method then updates the visual data sets associated with the selected element model, dependent upon different learning rates.

According to a first aspect of the present disclosure, there is provided a computer-implemented method of performing foreground/background separation on an input image. The method includes the steps, for each input visual element in the input image, of: identifying a corresponding model visual element in a scene model associated with the input image, the model visual element being associated with a set of element models, each element model including a plurality of visual data sets; selecting an element model from the set of element models dependent upon a visual distance between the input visual element and a visual data set of the selected element model satisfying a predetermined criterion; classifying the input visual element as one of foreground and background dependent upon the selected element model; and updating each visual data set in the selected element model dependent upon the input visual element and at least first and second different methods of updating a visual data set.

According to a second aspect of the present disclosure, there is provided a computer readable storage medium having recorded thereon a computer program for performing foreground/background separation on an input image. The computer program includes code for performing the steps, for each input visual element in the input image, of: identifying a corresponding model visual element in a scene model associated with the input image, the model visual element being associated with a set of element models, each element model including a plurality of visual data sets; selecting an element model from the set of element models dependent upon a visual distance between the input visual element and a visual data set of the selected element model satisfying a predetermined criterion; classifying the input visual element as one of foreground and background dependent upon the selected element model; and updating each visual data set in the selected element model dependent upon the input visual element and at least first and second different methods of updating a visual data set.

According to a third aspect of the present disclosure, there is provided an apparatus for performing foreground/background separation on an input image. The apparatus includes a storage device for storing a computer program and a processor for executing the program. The program includes code for performing the method steps, for each input visual element in the input image, of: identifying a corresponding model visual element in a scene model associated with the input image, the model visual element being associated with a set of element models, each element model including a plurality of visual data sets; selecting an element model from the set of element models dependent upon a visual distance between the input visual element and a visual data set of the selected element model satisfying a predetermined criterion; classifying the input visual element as one of foreground and background dependent upon the selected element model; and updating each visual data set in the selected element model dependent upon the input visual element and at least first and second different methods of updating a visual data set.

According to a fourth aspect of the present disclosure, there is provided a computer-implemented method of performing foreground/background separation on an input video frame. The method includes the steps of: receiving a set of element models in a scene model associated with the frame, wherein each element model in the set of element models includes first and second visual sets; comparing, for a visual element at a locale in the scene model, the first and the second visual sets of at least one element model associated with that visual element with a visual set of a visual element in the frame corresponding to the locale; selecting, based on the comparing step, one of the first and the second visual sets with a visual distance from the visual set of the corresponding element satisfying a predetermined criterion; selecting an element model from the set of element models based on the selected visual set; classifying the input visual element as one of foreground and background based on the selected element model; updating the first visual set of the selected element model based on the visual set of the corresponding element using a first method; and updating the second visual set of the selected element model based on the visual set of the corresponding element using a second method that is different from the first method.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present disclosure will now be described with reference to the following drawings, in which:

FIG. 8 shows a graph with a problematic reversion scenario when there is a single set of visual data in an element model, and the visual set of data has a high $LR_{max}$.

DETAILED DESCRIPTION

Figure 1:
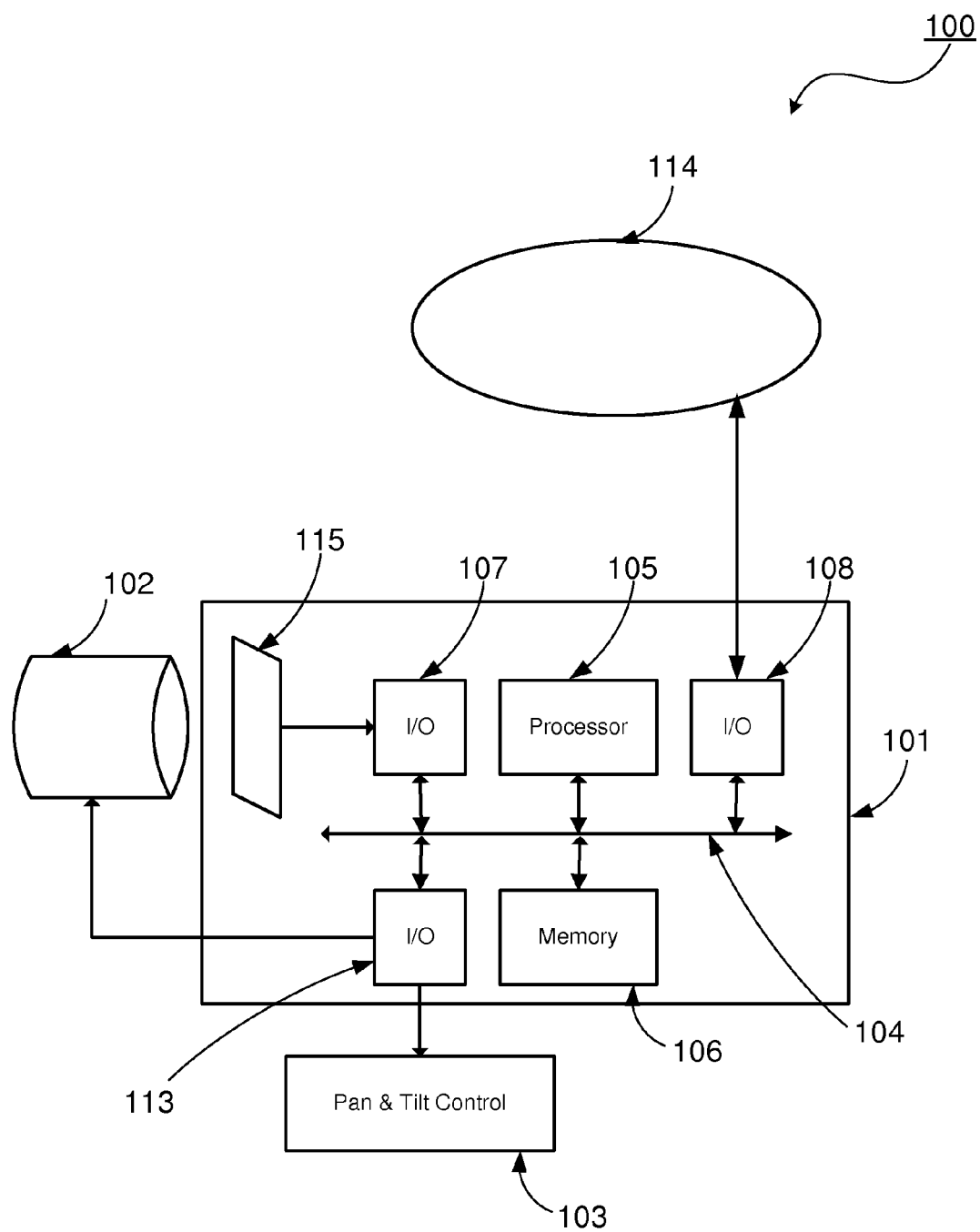
FIG. 1 shows a functional schematic block diagram of a camera, upon which foreground/background separation may be performed.

Where reference is made in any one or more of the accompanying drawings to steps and/or features that have the same reference numerals, those steps and/or features have for the purposes of this description the same function(s) or operation(s), unless the contrary intention appears.

A video is a sequence of images or frames. Thus, each frame is an image in an image sequence (video sequence). Each frame of the video has an x axis and a y axis. A scene is the information contained in a frame and may include, for example, foreground objects, background objects, or a combination thereof. A scene model is stored information relating to a scene and may include foreground, background, or a combination thereof. A scene model generally relates to background information derived from an image sequence. A video may be encoded and compressed. Such encoding and compression may be performed intra-frame, such as motion-JPEG (M-JPEG), or inter-frame, such as specified in the H.264 standard. An image is made up of visual elements. The visual elements may be, for example, pixels, or 8×8 DCT (Discrete Cosine Transform) blocks as used in JPEG images in a motion-JPEG stream, or wavelet domain transformed images as used in JPEG2000 images in a motion-JPEG2000 stream. A visual element position in the frame axis is represented by x and y coordinates of the visual element under consideration.

One representation of a visual element is a pixel visual element. In one embodiment, each visual element has three (3) values describing the visual element. In one example, the three values are Red, Green and Blue colour values (RGB values). The values representing characteristics of the visual element are termed as visual element attributes. The number and type of values associated with each visual element (visual element attributes) depend on the format utilised for the apparatus implementing an embodiment of the present disclosure. It is to be noted that values stored in other colour spaces, such as the four-valued Cyan, Magenta, Yellow, and Key black (CMYK), or values representing Hue-Saturation-Lightness, may equally be utilised, depending on the particular implementation, without departing from the spirit and scope of the present disclosure.

Another representation of a visual element uses 8×8 DCT blocks as visual elements. The visual element attributes for an 8×8 DCT block are 64 luminance DCT coefficients, 64 chrominance red (Cr) DCT coefficients, and 64 chrominance blue (Cb) DCT coefficients of the block. The 64 luminance DCT coefficients can be further divided into 1 DC coefficient, and 63 AC coefficients. The DC coefficient is a representation of average luminance value of the visual element and the AC coefficients represent the frequency domain information of the luminance characteristics of the 8×8 block. The AC coefficients are commonly ordered from lowest-frequency to highest-frequency components, organised in a zig-zag fashion. AC1 represents the DCT component with the lowest horizontal frequency. AC2 represents the horizontal component with the lowest vertical frequency, and so on. The higher-numbered AC coefficients correspond to higher frequencies. The attributes are represented as (Y, U, V, AC), representing the DC coefficient (Y), the chrominance values (U, V) and the AC coefficients (AC), giving 196 attributes in total. Many other combinations of attributes are possible or other attributes can be generated from the above mentioned attributes using machine learning algorithms, such as linear regression techniques.

It is to be noted that the described method may equally be practised using other representations of visual elements. For example, the DCT blocks can be of a different size to enable a different granularity for storing the attributes of the pixels represented by the DCT blocks. Other transforms, such as wavelet transforms, can also be used to generate representative attributes from the pixels within a scene so that a historical representation of the scene can be accumulated.

The present disclosure relates to a method and system for updating a scene model for use in performing foreground/background separation in image processing. The foreground/background separation can then be utilised to identify foreground objects in a video sequence. Detection of video objects using a scene model involves comparing a received input image with a scene model and consequently determining which portions or regions of the input image are foreground and which portions of the input image are background. The scene model is updated based on the input image and the results of the comparison.

The present disclosure provides a multi-modal scene model, wherein the scene model includes a plurality of visual elements and each visual element is associated with a set of element models, or modes. Each element model includes a plurality of visual data sets associated with a single temporal feature set. The method utilises the visual feature sets and the temporal feature set for comparison with the input image. For each visual element in the input image, the method identifies the corresponding set of element models. For each element model in the corresponding element model set, the method compares the visual data sets for that element model with the visual element that is being processed. Depending on the particular application and implementation, the method may also compare the temporal feature set for that element model with the visual element that is being processed. The method determines and selects, from the element models in the element model set associated with that visual element, an element model that is a best match for that visual element. The method then updates the visual feature data sets of the selected element model according to different rates. In one arrangement, a first visual data set is updated with a low learning rate and a second visual data set is updated with a high learning rate. Any further visual data sets associated with the selected element models are updated in accordance with predefined rates between the low learning rate and the high learning rate.

One arrangement updates the visual data sets by utilising at least first and second different methods of updating a visual data set, wherein the first and second different methods utilise a single function with different sets of parameters to effect the different learning rates. Thus, a first method for updating the first visual data set utilises an update function with a first set of parameters and a second, different, method for updating the second visual data set utilises the same update function with a second set of parameters, wherein the first set of parameters and second set of parameters are different, in order to effect different learning rates.

One arrangement updates the visual data sets by utilising at least first and second different methods of updating a visual data set, wherein the first and second different methods utilise a plurality of functions to effect the different learning rates. Thus, a first method for updating the first visual data set utilises a first update function with a first set of parameters and a second method for updating the second visual data set utilises a second update function with a second set of parameters, wherein the first function is different from the second function, in order to effect different learning rates.

In embodiments in which there are more than two visual data sets for an element model, each of the visual data sets is updated using a corresponding learning rate. In one implementation, the different learning rates are implemented using a single function with different parameters for each visual data set. In an alternative implementation, the different learning rates are implemented using different functions.

In an alternative embodiment, the method processes the element models in the element model set for the visual element that is being processed. However, it may not be necessary to process all of the element models in the element model set. Once an element model is identified that has a visual data set that provides a sufficiently good match for the visual element that is being processed, there is no need to process the remaining element models in that element model set. In this way, it is possible to reduce processing time. Whether or not a visual data set provides a sufficiently good match for the visual element may be determined, for example, by comparing a visual distance score between the visual data set and the visual element with a predefined threshold.

FIG. 1 shows a functional schematic block diagram of a camera, upon which methods of foreground/background separation in accordance with the present disclosure may be performed. The camera 100 is a pan-tilt-zoom camera (PTZ) comprising a camera module 101, a pan and tilt module 103, and a lens system 102. The camera module 101 typically includes at least one processor unit 105, a memory unit 106, a photo-sensitive sensor array 115, an input/output (I/O) interface 107 that couples to the sensor array 115, an input/output (I/O) interface 108 that couples to a communications network 114, and an interface 113 for the pan and tilt module 103 and the lens system 102. The components 107, 105, 108, 113, and 106 of the camera module 101 typically communicate via an interconnected bus 104 and in a manner that results in a conventional mode of operation known to those in the relevant art.

The camera 100 is used to capture video frames, also known as new input images, representing the visual content of a scene appearing in the field of view of the camera 100. Each frame captured by the camera 100 comprises one or more visual elements. A visual element is defined as a region in an image sample. An image sample can be a whole video frame or a portion of a video frame.

Methods of foreground/background separation in accordance with the present disclosure may equally be practised on a general purpose computer. Video frames captured by a camera are processed in accordance with instructions executing on the processor of the general purpose computer to identify foreground and background regions of a scene. In one arrangement, a video camera is coupled to a general purpose computer for processing of the captured frames. The general purpose computer may be co-located with the camera or may be located remotely from the camera and coupled by a communications link or network, such as the Internet. In another arrangement, video frames are retrieved from storage memory and are presented to the processor for foreground/background separation.

Figure 6A:
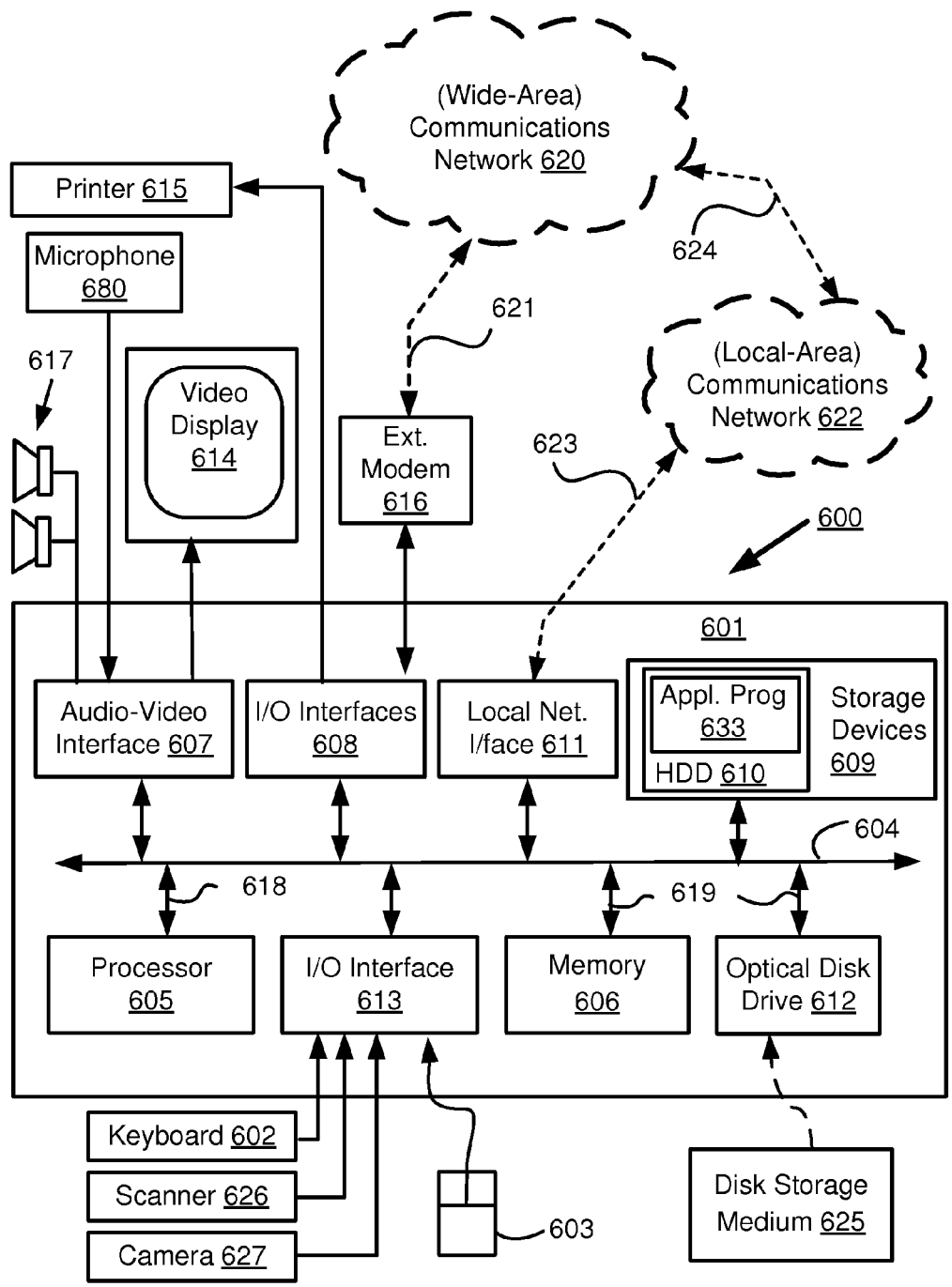
FIGS. 6A and 6B form a schematic block diagram of a general purpose computer system upon which arrangements described can be practised.
Figure 6B:
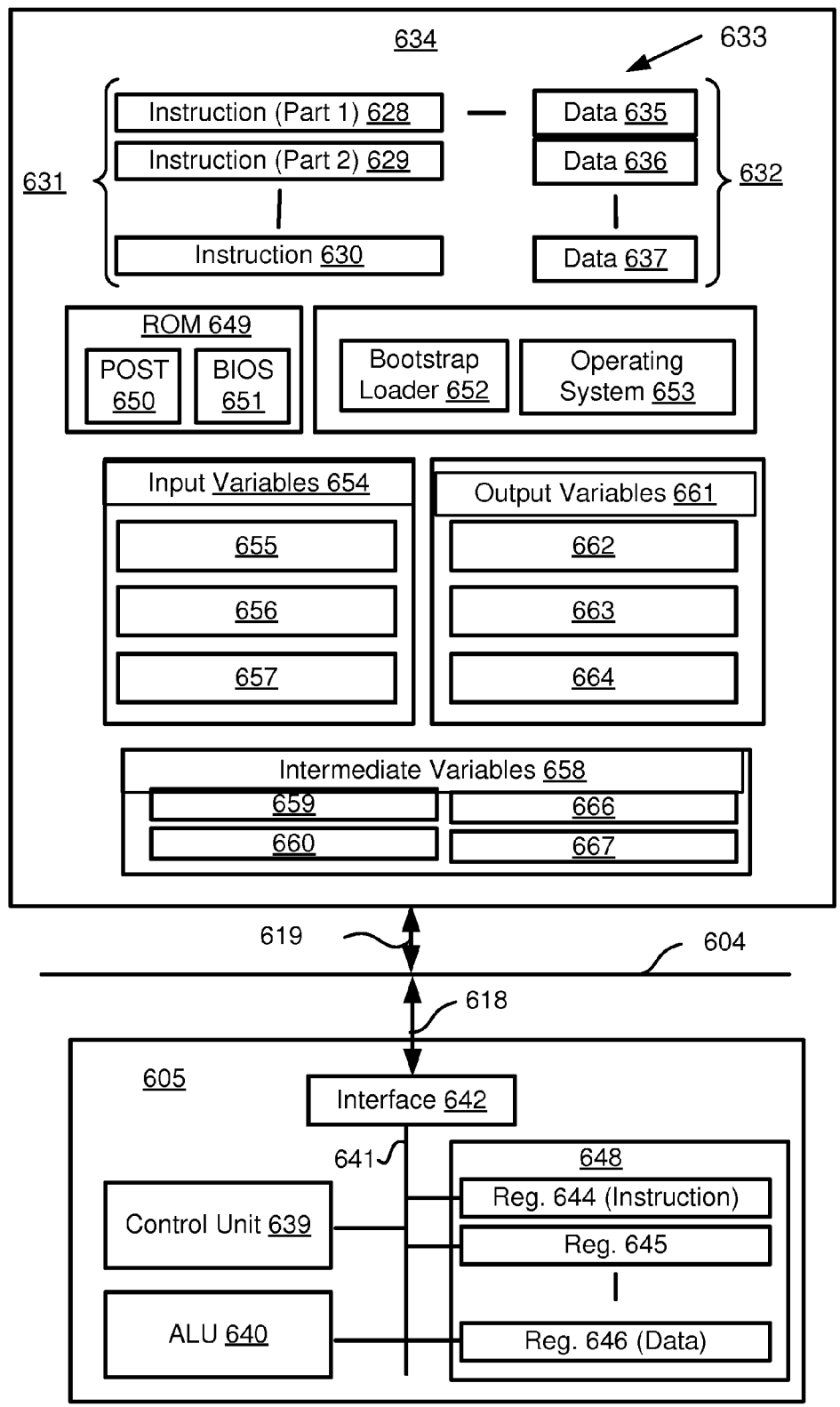

FIGS. 6A and 6B depict a general-purpose computer system 600, upon which the various arrangements described can be practised.

As seen in FIG. 6A, the computer system 600 includes: a computer module 601; input devices such as a keyboard 602, a mouse pointer device 603, a scanner 626, a camera 627, and a microphone 680; and output devices including a printer 615, a display device 614 and loudspeakers 617. An external Modulator-Demodulator (Modem) transceiver device 616 may be used by the computer module 601 for communicating to and from a communications network 620 via a connection 621. The communications network 620 may be a wide-area network (WAN), such as the Internet, a cellular telecommunications network, or a private WAN. Where the connection 621 is a telephone line, the modem 616 may be a traditional "dial-up" modem. Alternatively, where the connection 621 is a high capacity (e.g., cable) connection, the modem 616 may be a broadband modem. A wireless modem may also be used for wireless connection to the communications network 620.

The computer module 601 typically includes at least one processor unit 605, and a memory unit 606. For example, the memory unit 606 may have semiconductor random access memory (RAM) and semiconductor read only memory (ROM). The computer module 601 also includes an number of input/output (I/O) interfaces including: an audio-video interface 607 that couples to the video display 614, loudspeakers 617 and microphone 680; an I/O interface 613 that couples to the keyboard 602, mouse 603, scanner 626, camera 627 and optionally a joystick or other human interface device (not illustrated); and an interface 608 for the external modem 616 and printer 615. In some implementations, the modem 616 may be incorporated within the computer module 601, for example within the interface 608. The computer module 601 also has a local network interface 611, which permits coupling of the computer system 600 via a connection 623 to a local-area communications network 622, known as a Local Area Network (LAN). As illustrated in FIG. 6A, the local communications network 622 may also couple to the wide network 620 via a connection 624, which would typically include a so-called "firewall" device or device of similar functionality. The local network interface 611 may comprise an Ethernet™ circuit card, a Bluetooth™ wireless arrangement or an IEEE 802.11 wireless arrangement; however, numerous other types of interfaces may be practised for the interface 611.

The I/O interfaces 608 and 613 may afford either or both of serial and parallel connectivity, the former typically being implemented according to the Universal Serial Bus (USB) standards and having corresponding USB connectors (not illustrated). Storage devices 609 are provided and typically include a hard disk drive (HDD) 610. Other storage devices such as a floppy disk drive and a magnetic tape drive (not illustrated) may also be used. An optical disk drive 612 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 600.

The components 605 to 613 of the computer module 601 typically communicate via an interconnected bus 604 and in a manner that results in a conventional mode of operation of the computer system 600 known to those in the relevant art. For example, the processor 605 is coupled to the system bus 604 using a connection 618. Likewise, the memory 606 and optical disk drive 612 are coupled to the system bus 604 by connections 619. Examples of computers on which the described arrangements can be practised include IBM-PCs and compatibles, Sun Sparcstations, Apple Mac™, or alike computer systems.

The methods of performing foreground/background separation and detecting an object in image processing may be implemented using the computer system 600 wherein the processes of FIGS. 2 to 5 and 7 to 9, to be described, may be implemented as one or more software application programs 633 executable within the computer system 600. In particular, the steps of the method of performing foreground/background separation on an input video frame are effected by instructions 631 (see FIG. 6B) in the software 633 that are carried out within the computer system 600. The software instructions 631 may be formed as one or more code modules, each for performing one or more particular tasks. The software may also be divided into two separate parts, in which a first part and the corresponding code modules perform the foreground/background separation methods and a second part and the corresponding code modules manage a user interface between the first part and the user.

The software 633 is typically stored in the HDD 610 or the memory 606. The software is loaded into the computer system 600 from a computer readable medium, and executed by the computer system 600. Thus, for example, the software 633 may be stored on an optically readable disk storage medium (e.g., CD-ROM) 625 that is read by the optical disk drive 612. A computer readable medium having such software or computer program recorded on it is a computer program product. The use of the computer program product in the computer system 600 preferably effects an apparatus for performing foreground/background separation on an input image frame and may be utilised, for example, in surveillance and security applications.

In some instances, the application programs 633 may be supplied to the user encoded on one or more CD-ROMs 625 and read via the corresponding drive 612, or alternatively may be read by the user from the networks 620 or 622. Still further, the software can also be loaded into the computer system 600 from other computer readable media. Computer readable storage media refers to any non-transitory tangible storage medium that provides recorded instructions and/or data to the computer system 600 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 601. Examples of transitory or non-tangible computer readable transmission media that may also participate in the provision of software, application programs, instructions and/or data to the computer module 601 include radio or infra-red transmission channels as well as a network connection to another computer or networked device, and the Internet or Intranets including e-mail transmissions and information recorded on Websites and the like.

The second part of the application programs 633 and the corresponding code modules mentioned above may be executed to implement one or more graphical user interfaces (GUIs) to be rendered or otherwise represented upon the display 614. Through manipulation of typically the keyboard 602 and the mouse 603, a user of the computer system 600 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 617 and user voice commands input via the microphone 680.

FIG. 6B is a detailed schematic block diagram of the processor 605 and a "memory" 634. The memory 634 represents a logical aggregation of all the memory modules (including the HDD 609 and semiconductor memory 606) that can be accessed by the computer module 601 in FIG. 6A.

When the computer module 601 is initially powered up, a power-on self-test (POST) program 650 executes. The POST program 650 is typically stored in a ROM 649 of the semiconductor memory 606 of FIG. 6A. A hardware device such as the ROM 649 storing software is sometimes referred to as firmware. The POST program 650 examines hardware within the computer module 601 to ensure proper functioning and typically checks the processor 605, the memory 634 (609, 606), and a basic input-output systems is software (BIOS) module 651, also typically stored in the ROM 649, for correct operation. Once the POST program 650 has run successfully, the BIOS 651 activates the hard disk drive 610 of FIG. 6A. Activation of the hard disk drive 610 causes a bootstrap loader program 652 that is resident on the hard disk drive 610 to execute via the processor 605. This loads an operating system 653 into the RAM memory 606, upon which the operating system 653 commences operation. The operating system 653 is a system level application, executable by the processor 605, to fulfil various high level functions, including processor management, memory management, device management, storage management, software application interface, and generic user interface.

The operating system 653 manages the memory 634 (609, 606) to ensure that each process or application running on the computer module 601 has sufficient memory in which to execute without colliding with memory allocated to another process. Furthermore, the different types of memory available in the system 600 of FIG. 6A must be used properly so that each process can run effectively. Accordingly, the aggregated memory 634 is not intended to illustrate how particular segments of memory are allocated (unless otherwise stated), but rather to provide a general view of the memory accessible by the computer system 600 and how such is used.

As shown in FIG. 6B, the processor 605 includes a number of functional modules including a control unit 639, an arithmetic logic unit (ALU) 640, and a local or internal memory 648, sometimes called a cache memory. The cache memory 648 typically includes a number of storage registers 644-646 in a register section. One or more internal busses 641 functionally interconnect these functional modules. The processor 605 typically also has one or more interfaces 642 for communicating with external devices via the system bus 604, using a connection 618. The memory 634 is coupled to the bus 604 using a connection 619.

The application program 633 includes a sequence of instructions 631 that may to include conditional branch and loop instructions. The program 633 may also include data 632 which is used in execution of the program 633. The instructions 631 and the data 632 are stored in memory locations 628, 629, 630 and 635, 636, 637, respectively.

Depending upon the relative size of the instructions 631 and the memory locations 628-630, a particular instruction may be stored in a single memory location as depicted by the instruction shown in the memory location 630. Alternately, an instruction may be segmented into a number of parts each of which is stored in a separate memory location, as depicted by the instruction segments shown in the memory locations 628 and 629.

In general, the processor 605 is given a set of instructions which are executed therein. The processor 605 waits for a subsequent input, to which the processor 605 reacts to by executing another set of instructions. Each input may be provided from one or more of a number of sources, including data generated by one or more of the input devices 602, 603, data received from an external source across one of the networks 620, 602, data retrieved from one of the storage devices 606, 609 or data retrieved from a storage medium 625 inserted into the corresponding reader 612, all depicted in FIG. 6A. The execution of a set of the instructions may in some cases result in output of data. Execution may also involve storing data or variables to the memory 634.

The disclosed object detection arrangements use input variables 654, which are stored in the memory 634 in corresponding memory locations 655, 656, 657. The object detection arrangements produce output variables 661, which are stored in the memory 634 in corresponding memory locations 662, 663, 664. Intermediate variables 658 may be stored in memory locations 659, 660, 666 and 667.

Referring to the processor 605 of FIG. 6B, the registers 644, 645, 646, the arithmetic logic unit (ALU) 640, and the control unit 639 work together to perform sequences of micro-operations needed to perform "fetch, decode, and execute" cycles for every instruction in the instruction set making up the program 633. Each fetch, decode, and execute cycle comprises:

(a) a fetch operation, which fetches or reads an instruction 631 from a memory location 628, 629, 630;

(b) a decode operation in which the control unit 639 determines which instruction has been fetched; and (c) an execute operation in which the control unit 639 and/or the ALU 640 execute the instruction.

Thereafter, a further fetch, decode, and execute cycle for the next instruction may be executed. Similarly, a store cycle may be performed by which the control unit 639 stores or writes a value to a memory location 632.

Each step or sub-process in the processes of FIGS. 2 to 5 and 7 to 9 is associated with one or more segments of the program 633 and is performed by the register section 644, 645, 647, the ALU 640, and the control unit 639 in the processor 605 working together to perform the fetch, decode, and execute cycles for every instruction in the instruction set for the noted segments of the program 633.

The method of performing foreground/background separation on an input image may alternatively be implemented in dedicated hardware such as one or more integrated circuits performing the functions or sub functions of identifying a model visual element, selecting an element model from a set of element models, determining visual distances between a visual data set and an input visual element, classifying a visual element as one of foreground and background, and updating visual data sets based on the input visual element and different updating methods. Such dedicated hardware may include graphic processors, digital signal processors, or one or more microprocessors and associated memories.

Disclosed herein are a computer-implemented method, system, and computer program product for performing foreground/background separation on an input image. The input image may be, for example, a video frame of a video sequence. The input image includes a plurality of visual elements. For each input visual element in the input image, the method identifies a corresponding model visual element in a scene model associated with the input image. The model visual element is associated with a set of element models, wherein each element model includes a plurality of visual data sets. For a multi-modal scene background, each element model may optionally include a temporal data set, wherein the plurality of visual data sets for an element model are associated with a single temporal data set.

The method then selects an element model from the set of element models, dependent upon a visual distance between the input visual element and a visual data set of the selected element model satisfying a predetermined criterion. The method then proceeds to classify the input visual element as one of foreground and background, dependent upon the selected element model, and then updates each visual data set in the selected element model. Updating of the visual data sets is dependent upon the input visual element and at least first and second different methods of updating a visual data set.

In an exemplary arrangement, a visual element is an 8 by 8 block of Discrete Cosine Transform (DCT) coefficients as acquired by decoding a motion-JPEG frame. In one arrangement, the blocks are non-overlapping. In another arrangement, blocks overlap. In other arrangements, a visual element is: a pixel, such as a Red-Green-Blue (RGB) pixel; a group of pixels; or a block of other transform coefficients, such as Discrete Wavelet Transformation (DWT) coefficients as used in the JPEG-2000 standard. The colour model is typically YUV, where the Y component represents the luminance, and the U and V components represent the chrominance.

In one arrangement, a method for performing foreground/background separation of visual elements appearing in video frames to identify foreground objects and background is achieved by comparing the captured input visual elements at a point in time to corresponding visual elements at the same locale, or corresponding position, in a scene model.

Figure 2:
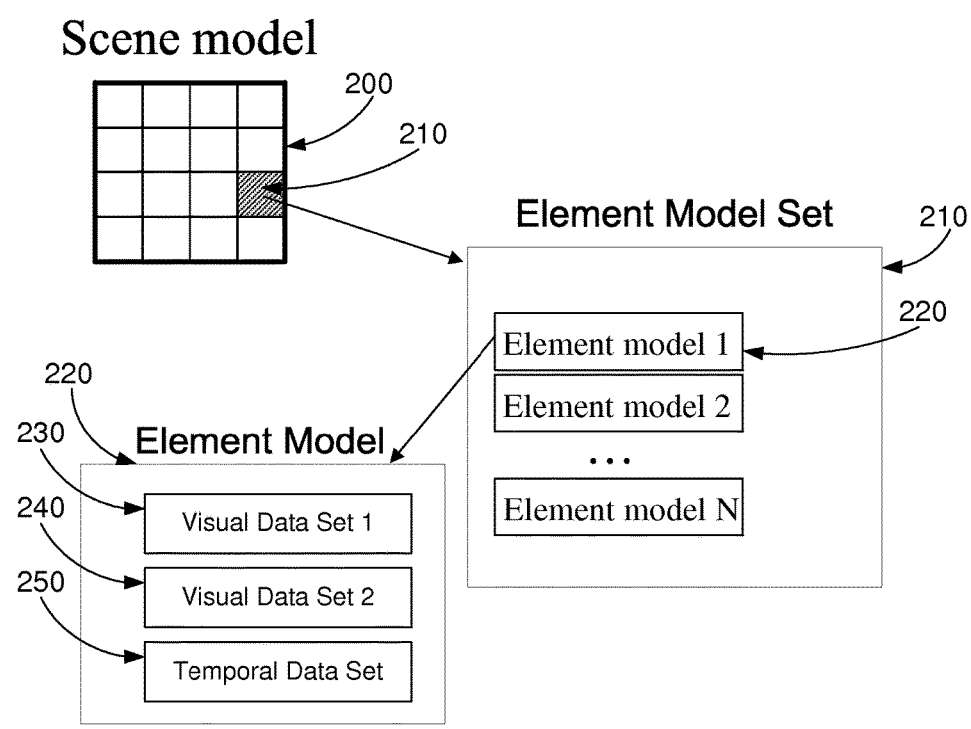
FIG. 2 shows a block diagram of a scene model consisting of element models.

FIG. 2 shows a block diagram of a scene model 200 that includes element models. In this example, the scene model 200 includes a group of visual elements presented as an array. The visual elements of the scene model may be referred to as model visual elements. The scene model 200 contains a unique element model set associated with each visual element. Each element model set contains one or more element models. In one arrangement, an element model (also called a mode model, or mode) refers to an adaptive representation of a region of a scene, which contains visual as well as temporal information about the region. An element model is classified as being either foreground or background. An element model that is foreground may be re-classified as background, over time.

In the example of FIG. 2, the scene model 200 includes an element model set 210 associated with a visual element in the scene model 200. The element model set 210 includes at least one element model. In this example, the element model set 210 includes a set of element models: Element Model 1, Element Model 2, . . . Element Model N.

In an exemplary arrangement, Element Model 1 220 is associated with a first set of to visual data 230, a second set of visual data 240, and a temporal data set 250. The two sets of visual data 230, 240 are associated with the same set of temporal data 250. In other arrangements, an element model may contain further sets of visual data associated with the same set of temporal data 250. Coupling at least two sets of visual data to the same set of temporal data allows the development of a robust scene model during different types of changes, including scene change-reversion scenarios.

Each of the first and second visual data sets 230, 240 contains a visual representation of a previously seen visual element at that locale. The previously seen visual element may, for example, have been identified during earlier processing of preceding video frames. In an exemplary arrangement, a visual representation contains 8 values: the first 6 luminance DCT transform coefficients, the first chrominance blue DCT transform coefficient, and the first chrominance red DCT transform coefficient within an 8 by 8 pixel block in the YCbCr colour space. In another arrangement, a visual representation contains a different set of transform coefficients, such as Fourier transform coefficients or DWT coefficients. In another arrangement, a visual representation is an RGB pixel. Each individual value within a visual representation can be considered to be a visual characteristic of that visual representation.

The temporal data set 250 includes temporal information related to the element model 220. In one exemplary arrangement, the temporal information includes a "matching time" corresponding to when the model was last matched to an input visual element, a "creation time" corresponding to when the model was created, a "deletion time" corresponding to when the model is to be deleted, and a "matching count" corresponding to how many times the model has matched an input visual element.

By including a second set of visual data 240 coupled to the same set of temporal data 250 as the first set of visual data 230, the model is more robust to different types of changes. When there is a fast and steady change to an input visual element that is being processed and that change is prolonged, a first set of visual data 230 within the element model 220 is able to track the change. In real video data, sometimes the input will then undergo a sudden reversion to a previous steady state. In this case, the first set of visual data 230 will no longer be representative of the input visual element and will cause a misdetection of a foreground object. A second set of visual data 240 in the element model 220 that adapts more slowly than the first set of visual data 230 will still be similar to the original steady state of the input, thus reducing misdetections.

The scene model 200 is used to represent visual elements within the scene captured at different points in time. As described above, the element model set 210 includes at least one element model, wherein each element model is classified as either a background element model or a foreground element model. Background element models corresponding to visual elements within the scene model 200 can be used to form a representation of the non-transient parts visible in the scene. Accordingly, the background element models describe a scene containing no foreground objects. The combined set of background element models can be referred to as the background model.

In one arrangement, the scene model 200 is initialised using a predetermined number of initial images. In one particular arrangement, the initial images include one or more initial video frames from a video sequence that is to be processed. In another arrangement, a single test image is utilised as the initial image. The single test image may, for example, be based on a known or expected background.

In one arrangement, a first frame of a video sequence is used as the background model. If the frame contains no foreground objects, that first frame is an accurate background model for the scene, or field of view of the camera, as that first frame is a representation of the non-transient parts visible in the scene. However, using the first frame as the background model is not robust against gradual changes within the scene, or against illumination effects. Also, the assumption that the first frame contains no foreground objects is generally not realistic. Foreground element models within the scene model 200 form a representation of the transient parts of the scene, which correspond to foreground objects that are currently within the scene, or have recently left the scene.

Figure 3:
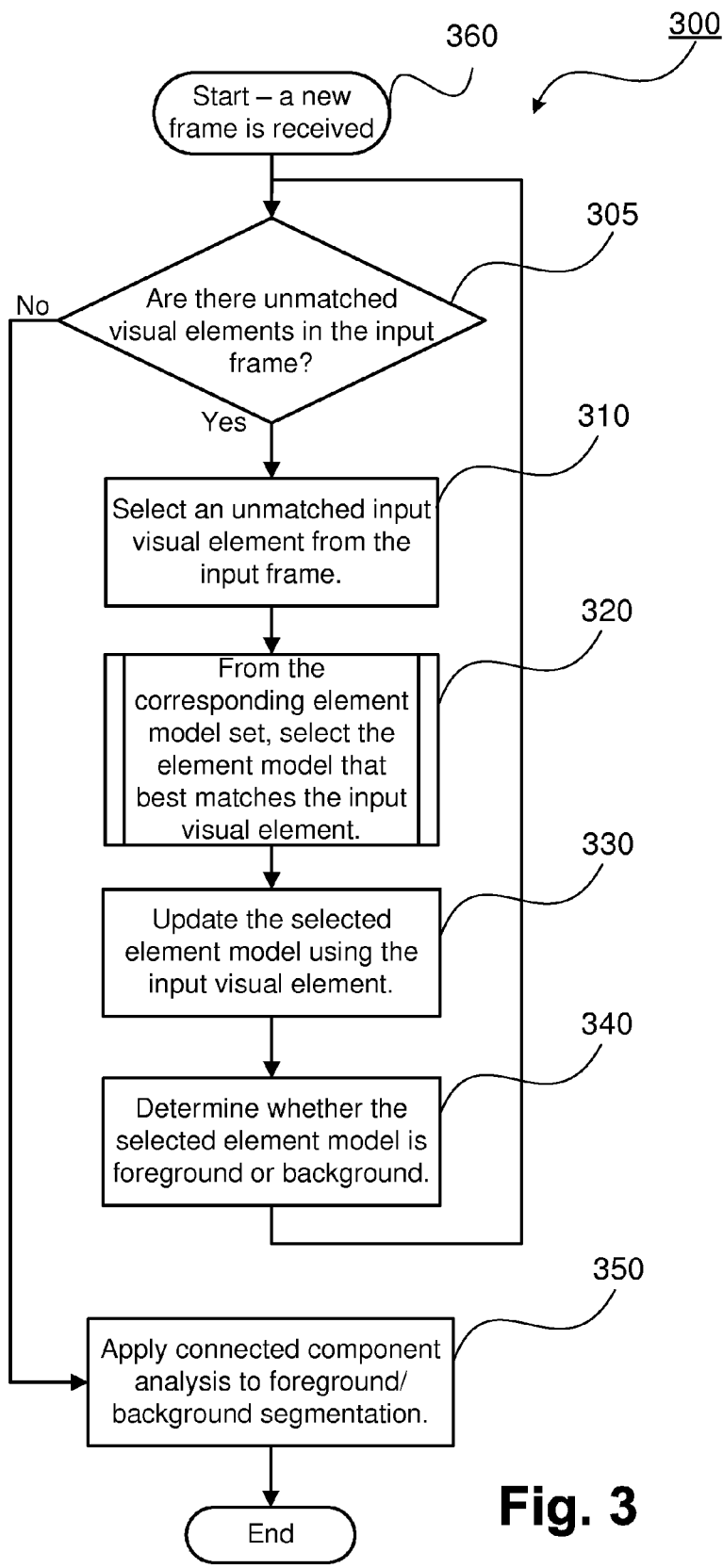
FIG. 3 shows a schematic flow diagram illustrating a method of matching the scene model to an input frame.

FIG. 3 shows a schematic flow diagram illustrating a method 300 of matching a scene model to a new input frame. The method 300 begins at a Start step 360, which receives a new input image for processing. The input image includes at least one input visual element. Control passes to a first decision step 305 to check if any of the visual elements in the input frame have not been matched to a corresponding element model in the scene model 200. If all of the visual elements in the input frame have been matched, and consequently there are no unmatched elements, No, then flow passes from decision step 305 to a connected component step 350. Depending on the application, processing of the input image can be restricted to one or more portions of the input image. In such applications, it is not necessary to process every visual element in the input image and only visual elements in the portions, or regions, of interest are processed to assist in the identification of foreground objects.

If at decision step 305 there are visual elements in the input frame that have not been matched to a corresponding element in the scene model 200, yes, then flow continues on to a next step 310, which selects an unmatched visual element from the input frame. After that, a process 320 selects from the corresponding locale in the scene model 200 an element model that best matches the selected unmatched input visual element from the input frame. Selecting the best matching element model is based on visual data sets within the element models. Further, temporal data sets within the element models can optionally be utilised to improve the quality of the match. In one arrangement, selecting the element model is dependent upon a visual distance between the input visual element that is being processed and a visual data set of the selected element model satisfying a predetermined criterion. In one implementation, the criterion is that the visual distance satisfies a predefined threshold. In an alternative implementation, the criterion relates to the element model having a visual data set with the smallest visual distance to the input visual element.

The flow continues from step 320 to a model update step 330, which updates the element model selected by the process 320. The update step 330 updates the selected element model, including the first set of visual data 230, the second set of visual data 240, and the temporal data set 250. When first and second visual data sets 230 and 240 are used in addition to temporal data set 250, this approach is also referred to as Dual Approach. The visual data sets and temporal data sets of the element models that were not selected by the process 320 are generally not updated. Depending on the particular application, embodiments may utilise more than two visual data sets in association with each temporal data set. In such embodiments, step 320 updates each of the relevant data sets. Utilising more than two visual data sets allows the system to apply different levels of granularity to track changes to the input image. The visual data sets are configured to change or adapt at different rates. Consequently, there is a better probability for providing a good match to a change to the input image.

After the model update step 330, a background thresholding step 340 determines whether the selected element model is a foreground model or a background model. The background threshold step 340 uses temporal characteristics in the temporal data set 250 of the element model 220 to determine whether the element model is a foreground model or a background model. In one arrangement, the temporal characteristic "age of an element model", from the temporal characteristics set, is used for the background thresholding step 340. If the age of the element model is greater than a predefined threshold value, the background threshold, then the method classifies the element model as a background element model; otherwise, the method classifies the element model as a foreground element model.

In one example, the background threshold is set to 120 seconds. The age of the element model is the current time minus the creation time of the element model. In one arrangement, the creation frame number, which is the number of the frame in which the element model was first created, and the current frame number are used to compute the age of the element model. The background threshold is then expressed in frames, say three thousand and six hundred (3600) frames. In one arrangement, the temporal characteristic "hit count" is used. Hit count represents the number of times the element model has been encountered (i.e., matched) in the input image stream. If the hit count is greater than another predefined threshold, the hit count threshold, the element model is considered to be a model of the background. Otherwise, the element model is considered to be a foreground model. In one example, the hit count threshold is set to one thousand eight hundred (1800). In one arrangement, both age and hit count are used to classify the element model: the element model is background if age exceeds the background threshold and hit count exceeds the hit count threshold.

The control flow now continues from step 340 back to the decision step 305. If all input visual elements have been processed and no visual elements remain unmatched, No, then flow passes from step 305 to the connected component analysis step 350. The connected component analysis step 350 combines neighbouring matched foreground element models into blobs, and creates temporal statistics for each foreground blob, based on the temporal data sets of the foreground element models within the blob. Each "blob" is a group of foreground neighbouring element models.

Figure 4:
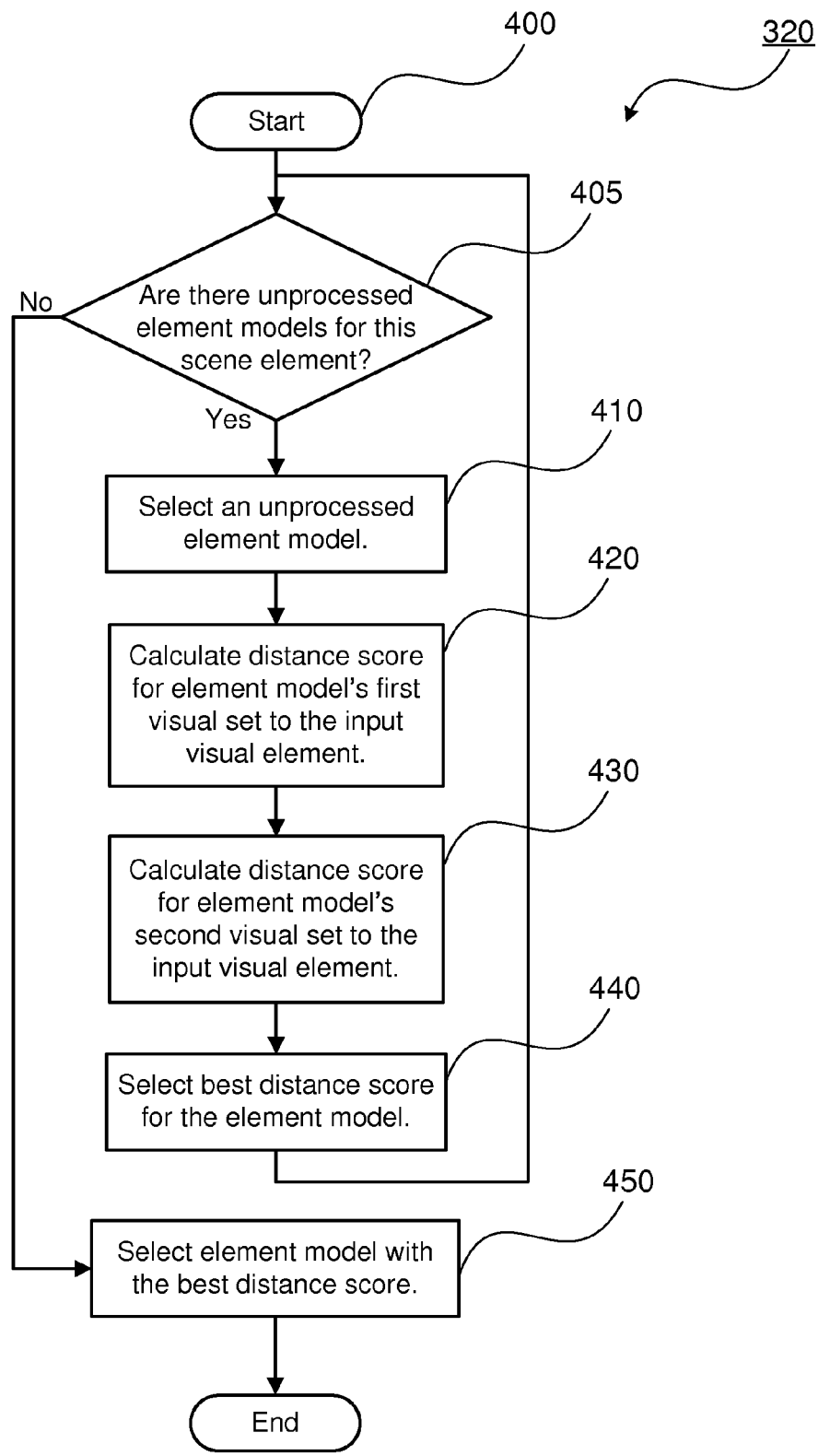
FIG. 4 shows a schematic flow diagram illustrating a method of selecting an element model that matches an input visual element as used in the method of FIG. 3.

FIG. 4 elaborates on the process 320 of FIG. 3, and shows a schematic flow diagram illustrating a method of selecting an element model that matches an input visual element. The process 320 begins at a Start step 400 and proceeds to a first decision step 405, which checks if all the element models have been compared to the input visual element and thus determines whether there are any unprocessed element models for the current scene element that is being processed. If all of the element models have been compared to the input visual element and there are no unprocessed element models remaining, No, then control passes to a select best element model step 450.

If at decision step 405 there are remaining unprocessed element models to be compared, yes, then control flow passes from decision step 405 to step 410, which selects an unprocessed element model. After that, step 420 determines a visual distance score (VD) for a first visual data set from the unprocessed element model. Control passes from step 420 to step 430, which determines the VD for a second visual data set from the unprocessed element model.

The VD for visual set number v is calculated using a weighted sum of the absolute difference between each value in the input visual element and the visual set, as shown by the following equation:

$$VD_{visual\_set} = \sum_{k=0}^{n} (w_k * |C_v[k] - C_I[k]|) \quad \text{Eqn (1)}$$

Where: n is the number of coefficients used to model the visual element; $C_I[k]$ is the value of the $k^{th}$ coefficient from the input visual element; $C_v[k]$ is the value of $k^{th}$ coefficient from visual set v in the element model; and $W_k$ is the weight for the $k^{th}$ coefficient. A lower VD indicates a closer match between the input visual element and the visual data set from the element model.

The weights $W_k$ for each coefficient in the visual data sets are chosen based on machine learning from sample data.

Control passes from step 430 to step 440. Step 440 is a scene matching step, which selects the best VD for the element model by selecting the smallest VD out of the VDs for each set of visual data in the element model. The VD for the element model is shown by the following equation:

$$VD_{mdl} = \min\left(\sum_{k=0}^{n} (w_k * |C_{set1}[k] - C_I[k]|), \sum_{k=0}^{n} (w_k * |C_{set2}[k] - C_I[k]|)\right) \quad \text{Eqn (2)}$$

Using the equation for $VD_{visual\_set}$ (Eqn 1), the above equation to select the VD for an element model (Eqn 2) can be written as:

$$VD_{mdl} = \min(VD_{set1}, VD_{set2}) \quad \text{Eqn (3)}$$

In other arrangements with N sets of visual data, the equation to select the VD for an element model becomes:

$$VD_{mdl} = \min(VD_{set1}, VD_{set2}, \ldots, VD_{setN}) \quad \text{Eqn (4)}$$

In another arrangement, the selected VD is calculated by a weighted sum using the is minimum value of the absolute difference between the first visual data set coefficient and the input visual element coefficient, and the absolute difference between the second visual data set coefficient and the input visual element coefficient, as shown in the following equation:

$$VD_{mdl} = \sum_{k=0}^{n} (w_k * \min(|C_{set1}[k] - C_I[k]|, |C_{set2}[k] - C_I[k]|)) \quad \text{Eqn (5)}$$

In one arrangement, the VD is adjusted based on the temporal characteristics and the characteristics of the neighbouring blocks.

Once step 440 has selected the best distance score for the element model, control returns to the decision step 405. If there are no remaining unprocessed element models, No, then control passes from step 405 to step 450, which selects the element model with the best VD. If no element model has a lower VD than a predetermined threshold value, henceforth referred as the sensitivity level, then a new element model is created that models the input visual element. The match to an existing element model, or the match to a newly created element model, is a visual classification step.

The sensitivity level defines how different an input visual element needs to be, compared to the existing element models, to create a new element model. The sensitivity level depends on the particular application and may, for example, be chosen based on the machine learning from sample data. In an exemplary arrangement, the sensitivity level is 1158. It will be appreciated by a person skilled in the relevant art that the sensitivity level will depend on the particular application.

The sensitivity level affects how often new element models are created. A high sensitivity level results in fewer new element models being created, and therefore results in more matches to existing element models. With a higher sensitivity level, there will be more matches to background models, as fewer foreground models will be created, and thus the output will contain fewer matched foreground models. A low sensitivity level results in more new element models being created, and therefore fewer matches to existing models. As new element models are initially foreground models, with a low sensitivity level the output will contain more matched foreground models and more newly created, foreground models.

The radius of the visual match region for a set of visual data can be envisaged to be the sensitivity level. The larger the sensitivity level, the larger the visual match region for a set of visual data. Graphically, if the input visual element falls within the visual match region of a set of visual data, then the set of visual data could be matched to the input visual element.

Returning to FIG. 3, in the updating step 330 of the Dual Approach method 300, the temporal data set 250 is updated using the current state of the temporal data, and the current time. The creation time of the element model remains unchanged. A "match count" for the element model is incremented, until a predefined maximum match count is reached. A "last match time" for the element model is set to the current time. A deletion time for the element model is increased. In an exemplary arrangement, the deletion time is updated to be the creation time of the element model, plus a life expectancy. The life expectancy is calculated by multiplying the match count of the model by a scalar, and then adding an offset. In one implementation, the scalar is set to a value of 6 at 30 frames per second and the offset is set to a value of 32 at 30 frames per second.

The first set of visual data 230 and second set of visual data 240 in the selected element model 220 are updated using the input visual element. In one arrangement, the first set of visual data 230 and second set of visual data 240 are updated with the same method, but with different parameter settings for the learning rate threshold $LR_{max}$. $LR_{max}$ represents the maximum change allowed for a mode coefficient per update. The first set of visual data 230 is updated using a higher learning rate (HLR) threshold than the second set of visual data 240 which is updated with a lower learning rate (LLR) threshold. In one example, the HLR threshold is set to 1.5 DCT coefficients at 30 frames per second and the LLR threshold is set to 0.0625 DCT coefficients at 30 frames per second. In another arrangement, the first set of visual data 230 is updated using a method that adapts more quickly to changing background values than the method used to update the second set of visual data 240. In both arrangements, the first set of visual data 230 can be called the high learning rate (HLR) visual data set and the second set of visual data 240 can be called the low learning rate (LLR) visual data set.

In an exemplary arrangement, the visual data sets are updated using an approximated median filter, using the equation shown below:

$$C_v^{t+1} = f(C_v^t, C_I, LR_{max})  \quad \text{Eqn (6)}$$

Where: $C_v^t$ denotes the coefficient value at time t for visual set v that is used in scene matching step 320; $C_v^{t+1}$ represents the updated mode coefficient value that will be used for scene matching in the next frame (at time t+1); C, represents the coefficient of the corresponding input element in the input frame; and f represents the approximated median updating function, which can be further elaborated as:

$$C_v^{t+1} = \begin{cases} C_v^t + \min(|C_v^t - C_I|, LR_{max}); & \text{if } C_v^t - C_I^1 \geq 0 \\ C_v^t - \min(|C_v^t - C_I|, LR_{max}); & \text{otherwise} \end{cases} \quad \text{Eqn (7)}$$

Figure 5:
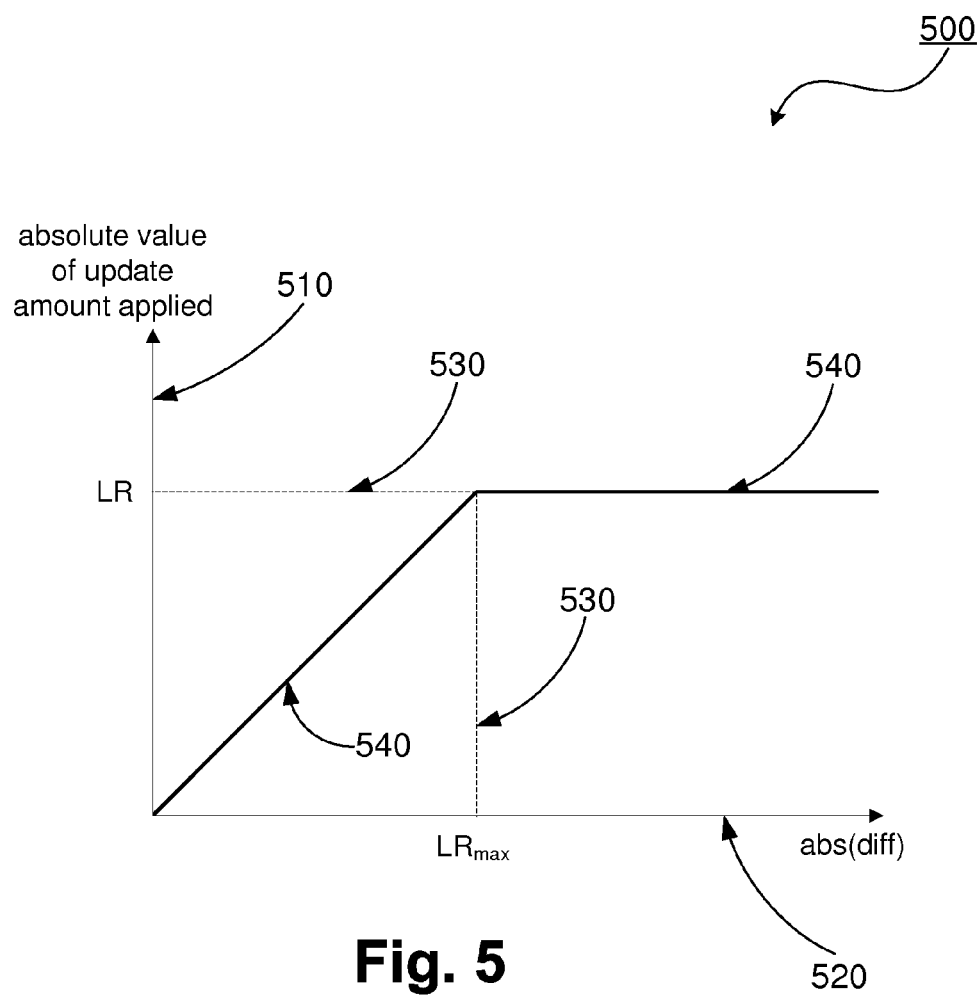
FIG. 5 shows a graph that shows how the value of the $LR_{max}$ controls the maximum change in the model value per frame.

FIG. 5 shows a graph 500 illustrating how the value of $LR_{max}$ affects the maximum change in the coefficient value per update. The graph 500 includes a vertical axis 510, which is the absolute update amount to be applied to the model value. This amount will be added to the model value (where the input value is greater than the model value) or subtracted from the model value (where the input value is less than the model value). The graph 500 also includes a horizontal axis 520, which is the absolute difference between the input coefficient value and element model coefficient value (henceforth, the absolute difference). A line 540 shows the absolute update amount applied to the element model coefficient value, for a given absolute difference. When the absolute difference is less than the $LR_{max}$ 530, the absolute difference is the absolute update amount 540. When the absolute difference is greater than the $LR_{max}$ 530, the $LR_{max}$ 530 is the absolute update amount 540.

By using a large value for the $LR_{max}$, the coefficient value will track quickly to large changes in the input value. When the change in input value per frame is large and is prolonged, a high $LR_{max}$ is required for the model to correctly track the input. Thus, the visual data set with a high $LR_{max}$ (HLR visual data set) will tend to track large changes in the input. If the change in the input occurs over too short a time or is too large for the model to track, then a new model can be erroneously created that will be foreground, but correspond to background.

In contrast, foreground that obscures background can briefly appear as background with a significant change over a small period of time. Therefore, the high learning rate threshold must be limited; that is, the high learning rate is not infinite.

However, situations can occur where there is a sudden reversion of localised input values to previous values after a prolonged change. Where the reversion occurs over a sufficiently short period of time, the reversion can cause a mismatch between the HLR visual data set and the input. The LLR visual data set responds slowly to the change in input values, so if the input undergoes a sudden reversion to a previous value, the LLR visual data set in the element model should still provide a match for the revised input.

The update process for the LLR visual data set and HLR visual set can be represented as:

$$C_{LLR}^{t+1} = f(C_{LLR}^t, C_I, \text{LLR}) \quad \text{Eqn (8)}$$

$$C_{HLR}^{t+1} = f(C_{HLR}^t, C_I, \text{HLR}). \quad \text{Eqn (9)}$$

The update process of Eqn (8) and Eqn (9) utilises a single function with different sets of parameters to effect the different learning rates. As described above, alternative arrangements may equally utilise different functions to effect the different learning rates.

In one arrangement, the update process of LLR visual data set can be further capped by a saturated update condition, using a "saturation value" to limit the change in the LLR set of visual data when the change in input values is high. The saturated update process includes two main steps: (1) detect sharp changes, and (2) avoid updating the LLR visual data set if a sharp change is detected. The equations below show the update condition for LLR visual data set:

$$C_{LLR}^{t+1} = s * f(C_{LLR}^t, C_I, \text{LLR}) \quad \text{Eqn (10)}$$

Where s represents a scaling factor that depends on the detection of a sharp change. In an exemplary arrangement, s is calculated as follows:

$$s = \begin{cases} 0 & \text{if } |C_{HLR} - C_I| \geq HLR \\ 1 & \text{otherwise} \end{cases} \quad \text{Eqn (11)}$$

In another arrangement, the saturation level for the LLR visual data set is separate from the HLR. In other arrangements, the saturation level methodology is represented using other techniques, such as modelling the absolute amount applied on a bell-shaped curve or a normal distribution.

FIG. 8 shows a graph 800 that illustrates a problematic reversion scenario, which occurs when there is a single set of visual data in an element model and the visual set of data has a high $LR_{max}$. This scenario is caused by temporary occlusion of the background by foreground. A vertical axis 810 shown on the graph 800 represents the magnitude of the input. A horizontal axis 820 shown on the graph 800 represents the frame number (representing elapsed time). An input value shown by the solid unbroken line 840 appears to be relatively stable in an initial period of approximately 900 frames, at which point the input 840 then has a fast and sustained change over a time period of approximately 200 frames, followed by a reversion back to the previously stable state. A value 850 in the visual set of data in the element model that corresponds to the input value is shown by the dashed line 850. At time t1 860, shown by a vertical dashed line, a very large difference between the input 840 and the corresponding value 850 in the visual set of data causes the element model to no longer be a match to the input visual element. Due to the high $LR_{max}$, the element model value 850 has been dragged off, or diverged from, the input stable value before the element model stops matching the input visual element at time t1 860. When the input value 840 undergoes the reversion back to the previously stable state, the difference between the element model value 850 and the input value 840 is sufficiently large to cause the element model not to match the input visual element. The desired behaviour of the system in this scenario would be for the element model, after the reversion, to match the input visual element. For this match to occur, after the reversion the element model value 850 must be similar to the input value 840. In the scenario shown in FIG. 8, the addition of a LLR visual data set, in particular a visual set of data with a low $LR_{max}$ that utilises the saturation level methodology, causes the system to produce the desired behaviour, as the low LR set of visual data will likely be similar to the input 840 after the reversion.

The dragging of the element model value 850, also termed divergence phenomenon, affects existing techniques in handling the scene change-reversion scenario. When large changes to the scene occur for a prolonged duration, the scene model characteristics diverge from the state of the scene model prior to the change. When a large prolonged change is followed by a sudden reversion, the scene model characteristics no longer match the input frame due to divergence of the scene model characteristics, resulting in false foreground detection.

Figure 9:
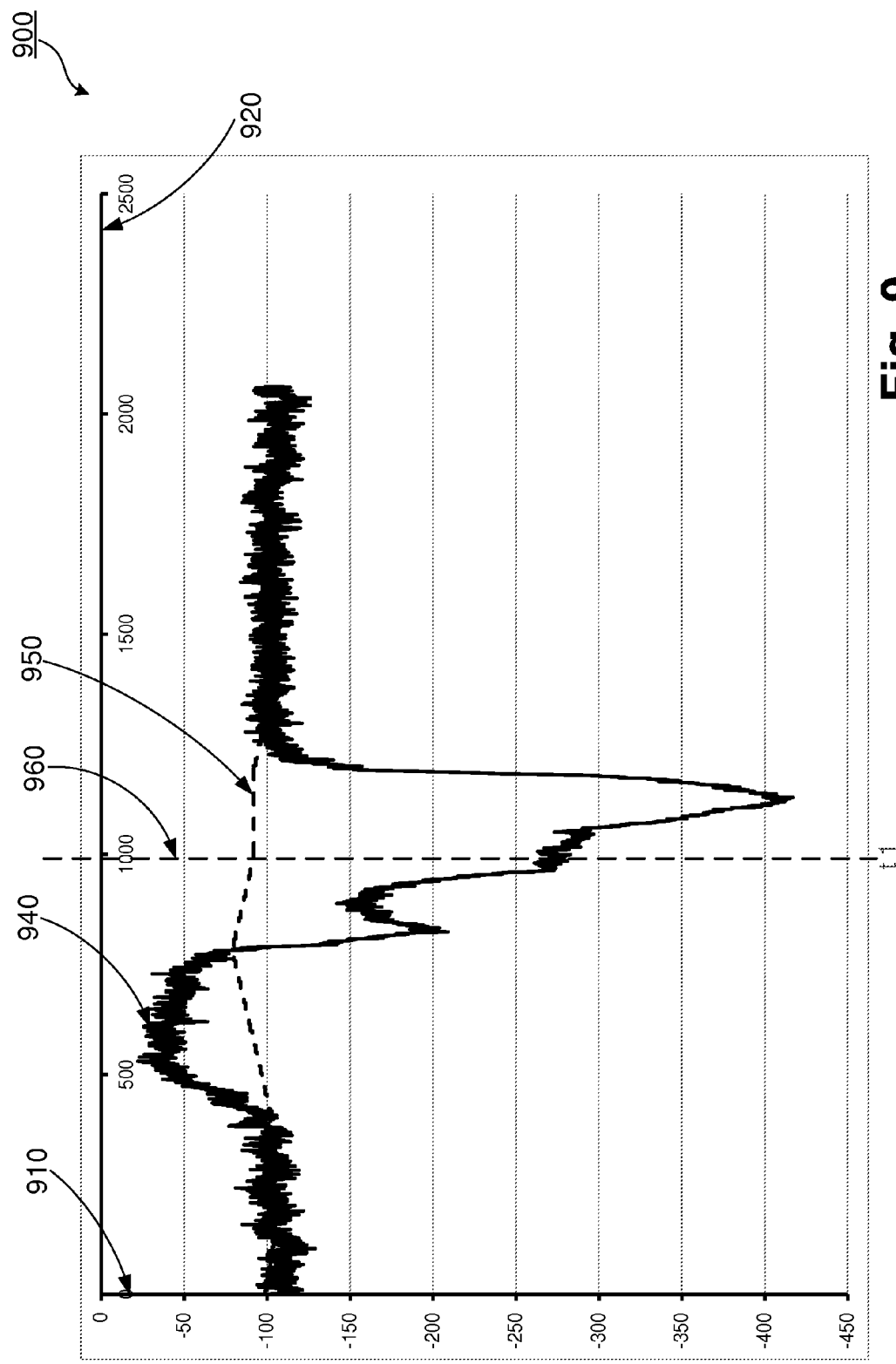
FIG. 9 shows a graph with a problematic reversion scenario when there is a single set of visual data in an element model, and the visual set of data has a low $LR_{max}$.

FIG. 9 shows a graph 900 illustrating a problematic reversion scenario, which occurs when there is a single set of visual data in an element model and the visual set of data has a low $LR_{max}$. This scenario is caused by a sudden localised lighting change. A vertical axis 910 in the graph 900 represents the magnitude of the input. A horizontal axis 920 in the graph 900 represents the frame number (representing elapsed time). An input value 940 shown by a solid unbroken line can be seen to first rise from a relatively steady state, then undergo a sustained fall around the $750^{th}$ frame, followed by a sudden reversion to the steady state value around the $1100^{th}$ frame. A value in the visual set of data in the element model that corresponds to the input value is shown by a dashed line 950. At time t1 960, shown by a vertical dashed line, the large difference between the input 940 and the corresponding value 950 in the visual set of data causes the element model to no longer be a match to the input visual element. From time t1 960 up until the input value 940 undergoes the sudden reversion, the element model does not match the input visual element, causing a localised misdetection until the sudden reversion of the input 940 occurs. The desired behaviour of the system is for the element model to match the input visual element despite the sustained fall and sudden reversion of the input 940. In the scenario shown in FIG. 9, the addition of a high LR set of visual data causes the system to is give the desired behaviour, as the high LR set of visual data will likely follow the input 940 as the input 940 temporarily falls.

Table 1 shows the benefit of having two sets of visual data associated with each temporal set of data and is based on information derived from processing a sample video. The numerical measurements F1 score and SFDA (Sequence Frame Detection Accuracy) are used to give quantitative measurements of performance, and are well known in the art.

TABLE 1

Comparison of Systems with one set and two sets of visual data

|  | System with one set of visual data | System with two sets of visual data | System with two sets of visual data and saturation level methodology |
| --- | --- | --- | --- |
| F1 Score | 0.13 | 0.30 | 0.31 |
| SFDA | 0.03 | 0.11 | 0.15 |

Figures 7A, 7B:
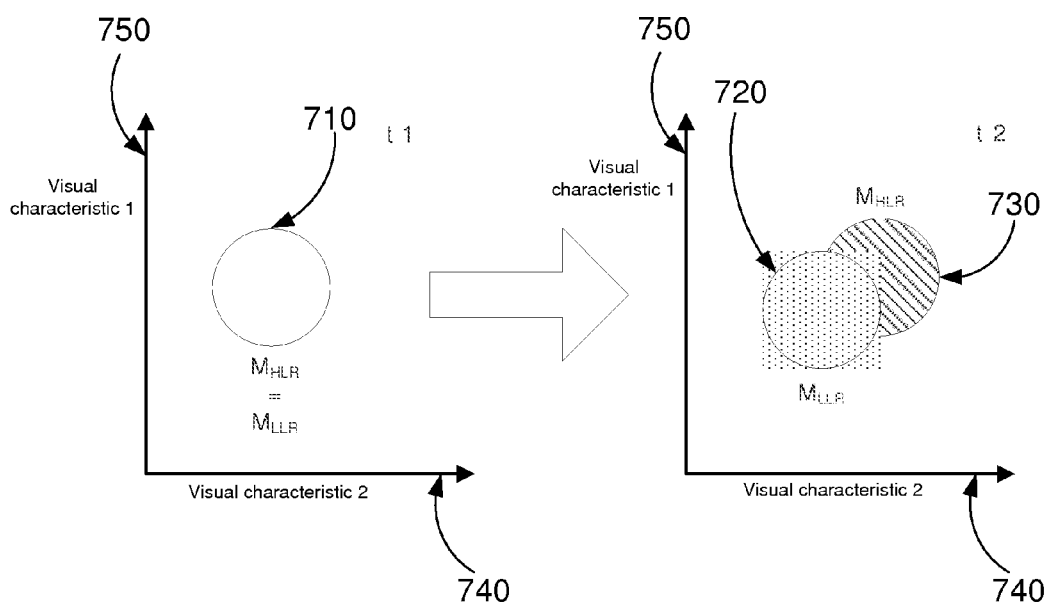
FIGS. 7A and 7B show divergence between the visual sets of data in a model over time.

When an element model is first created, both sets of visual data are the same. As time progresses, the sets of visual data may diverge, depending on the input visual element characteristics and the $LR_{max}$ value used for LLR and HLR sets. FIGS. 7A and 7B show a 2D representation of a visual match region for an element model and illustrate divergence between visual sets of data in a model over time. FIGS. 7A and 7B show axes 740, 750 representing only two of the visual characteristics in a set of visual data to show a stylised visual match region, instead of the actual visual match region, for each visual data set of the element model. In an exemplary arrangement, the visual data set is more than two-dimensional and thus the visual match region will be more than two-dimensional. An element model visual data set is shown as a circle, in which the centre of the circle represents the visual coefficients and the radius of the circle represents the sensitivity level. The circular region represents the visual match region for the visual data set.

In FIGS. 7A and 7B, $M_{LLR}$ denotes the LLR visual set and $M_{HLR}$ denotes the HLR visual set of the same element model. FIG. 7A shows the HLR and LLR visual data sets when the element model is created at time t1. During creation, the HLR visual data set 710 and the LLR visual data set 710 have the same visual characteristics and thus, fully overlap one another. FIG. 7B shows divergence between the visual sets of data in an element model over time. At time t2, it can be seen in FIG. 7B that the HLR visual data set 720 has diverged from the LLR visual data set 730. As a result, the total visual match region that the model occupies is also increased from having two visual data sets.

If the two visual data sets diverge too greatly, then steps can be taken to force the data sets to converge. In one arrangement, the visual data set that is more similar to the current input is kept, and the remaining visual data set is altered to be the same as the visual data set that is being kept.

In one arrangement, only background element models use both the HLR visual data set and LLR visual data set when matching the background element model to the input visual element. Foreground element models use only one visual data set when matching the foreground model to the input visual element. If the foreground element model becomes a background element model, then the background element model will start using the second set of visual data as well as the first set of visual data when matching to an input visual element. In one arrangement, a foreground element model uses a high learning rate threshold. In another arrangement, a foreground element model uses a low learning rate threshold. In another arrangement, a foreground element model uses a moderate learning rate threshold (between the high learning rate threshold and low learning rate threshold) as the learning rate threshold for the only set of visual data used. In another arrangement, foreground element models use both sets of visual data. In yet another arrangement, foreground element models start to use the second set of visual data once they pass a certain age (say, they are halfway to the background threshold).

The proposed approach enables more accurate maintenance of a background model in scene change-reversion scenarios, such as complex reversion scenarios where large and prolonged changes are followed by a quick and sudden reversion in the observation of the scene. Sudden reversion means a restoration to an original state before the prolonged changes started to occur. The Dual Approach's element model structure associates multiple visual representations 230, 240 with the same temporal characteristics 250 for each element model 220 in the set of element models 210 that are part of scene model 200. The Dual Approach enables robust video object detection during change-reversion scenarios.

INDUSTRIAL APPLICABILITY

The arrangements described are applicable to the computer and data processing industries and particularly for the video, imaging, and security industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of".

Variations of the word "comprising", such as "comprise" and "comprises", have correspondingly varied meanings.

This application claims priority from Australian Patent Application No. 2010-238543 filed Oct. 29, 2010, which is hereby incorporated by reference herein in its entirety.

We claim:

1. A computer-implemented method of performing foreground/background separation on an input image, said method comprising the steps of:
for each input visual element at a locale in said input image:
identifying, using a processor, corresponding model visual elements at respective locales in a scene model associated with said input image, by comparing each input visual element at each respective locale in said input image to each corresponding model visual element in the respective locale in the scene model, each said model visual element being associated with a set of element models, each element model including at least a first visual data set and a second visual data set forming parts of the element model, said first and second visual data sets being associated with a single temporal data set;
determining, using the processor, a first set of visual distances between each said first data set and each said input visual element at a locale in said input image, and determining a second set of visual distances between each said second visual data set and each said input visual element at a locale in said input image;
determining, using the processor, a set of visual distances for each element model including each said first visual data set and a second visual data set based on a comparison between said first set of visual distances and said second set of visual distances;
selecting, using the processor, element models from said set of element models dependent upon the determined set of visual distances for said selected element models satisfying a predetermined criterion;
updating, using the processor, the first visual data set forming one of the parts of said selected element models using a first method of updating a visual data set;
updating, using the processor, the second visual data set forming one of the parts of said selected element models using a second method of updating a visual data set that is different from the first method;
generating a database containing the updated visual data sets;
classifying, using the processor, said selected element models as one of foreground and background based on the updated visual sets stored in the database; and
identifying, using the processor, a foreground object in the input image based on at least one group of foreground element models formed by applying connected component analysis to the classified element models.

2. The method according to claim 1, wherein said classifying is dependent upon said temporal data set.

3. The method according to claim 1, wherein said step of selecting the element models from the set of element models is further based on a temporal data set.

4. The method according to claim 1, wherein said first method of updating a visual data set utilises a low learning rate and said second method of updating a visual data set utilises a high learning rate.

5. The method according to claim 1, wherein said first method of updating a visual data set is capped by a saturated update condition.

6. The method according to claim 1, further comprising the step of:
for each element model in said set of element models:
determining a visual distance between said input visual element and each visual data set in said element model;
wherein said predetermined criterion relates to having the smallest of said determined visual distances.

7. The method according to claim 1, wherein said input image includes a plurality of visual elements selected from the group of visual elements consisting of: a pixel; a group of pixels; and a block of transform coefficients.

8. The method according to claim 1, wherein said first method of updating a visual data set utilises a first function and a first set of parameters and said second method of updating a visual data set utilises said first function and a second set of parameters, wherein said first set of parameters is different from said second set of parameters.

9. The method according to claim 1, wherein said first method of updating a visual data set utilises a first function and a first set of parameters and said second method of updating a visual data set utilises a second function and a second set of parameters, wherein said first function is different from said second function.

10. The method according to claim 1, wherein said updating step utilises a corresponding learning rate for each of said plurality of visual data sets.

11. A computer readable storage medium having recorded thereon a computer program for performing foreground/background separation on an input image to be rendered, said computer program comprising code for performing the steps of:
for each input visual element at a locale in said input image:
identifying corresponding model visual elements at respective locales in a scene model associated with said input image, by comparing each input visual element at each respective locale in said input image to each corresponding model visual element in the respective locale in the scene model, each said model visual element being associated with a set of element models, each element model including at least a first visual data set and a second visual data set forming parts of the element model, said first and second visual data sets being associated with a single temporal data set;
determining a first set of visual distances between each said first data set and each said input visual element at a locale in said input image, and determining a second set of visual distances between each said second visual data set and each said input visual element at a locale in said input image;
determining a set of visual distances for each element model including each said first visual data set and a second visual data set based on a comparison between said first set of visual distances and said second set of visual distances;
selecting element models from said set of element models dependent upon the determined set of visual distances for said selected element models satisfying a predetermined criterion;
updating the first visual data set forming one of the parts of said selected element models using a first method of updating a visual data set; and updating the second visual data set forming one of the parts of said selected element models using a second method of updating a visual data set that is different from the first method;

generating a database containing the updated visual data sets;

classifying said selected element models as one of foreground and background based on the updated visual sets stored in the database; and identifying a foreground object in the input image based on at least one group of foreground element models formed by applying connected component analysis to the classified element models.

* * * * *